United States Patent Office 3,296,671
Patented Jan. 10, 1967

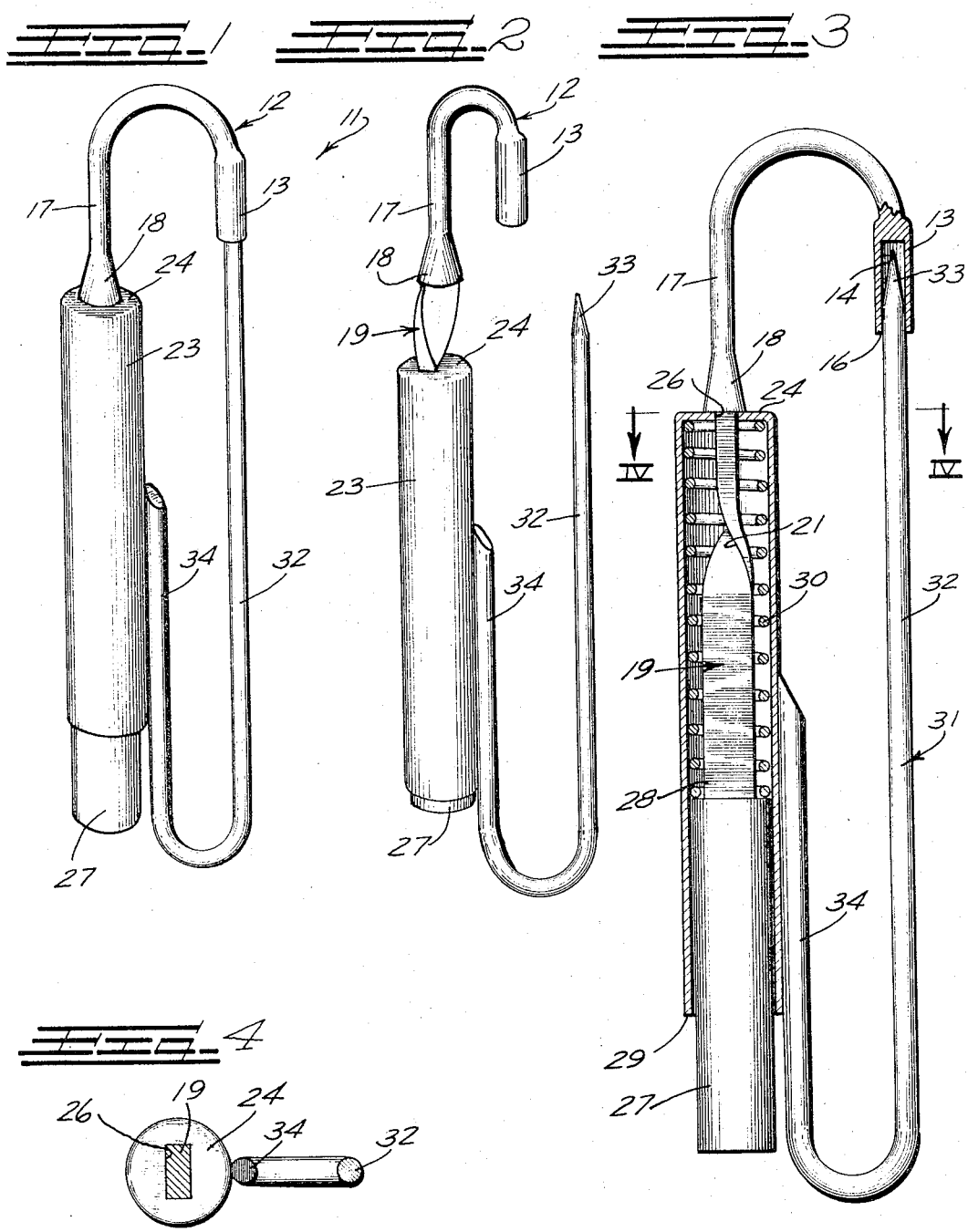

3,296,671
SAFETY PIN
Gabriel Pawlowski, 4105 N. Denley Ave.,
Schiller Park, Ill. 60176
Filed June 9, 1964, Ser. No. 373,699
7 Claims. (Cl. 24—156)

This invention generally relates to a safety pin and the like and more specifically relates to an improved self-closing safety pin which may be operated with one hand.

Present safety pins, although commonly referred to as "safety" pins, have many unsafe features. Most safety pins require a two-handed operation for opening and/or closing the pin and are so constructed that they remain in an open position until manual actuation by the person using them closes the pin. Thus, if the open pin is laid down on a chair or other surface it remains open with its injurious sharp point exposed. Further, these pins do not allow a person to effectively utilize both hands because they require two hands to operate them. My present invention eliminates these problems by providing a one-hand operated safety pin which is self-closing. Thus, the operator can use one hand for operating the safety pin and the other hand for maintaining a baby in diaper pinning position, for holding an unfinished knitted or crocheted article while using my safety pin or needle to retain the stitches on the unfinished knitted article, and for effectively locking and marking the last stitch on the unfinished crocheted article. Also, my safety pin's self-closing means does not allow the pin to remain in its open position when it is not in use and thus, the possibility of injuries being caused by an exposed sharp point is avoided.

Therefore, it is an object of the present invention to provide a safety pin which may be effectively operated with one hand and which is self-closing.

It is another object of the present invention to provide a safety pin whose needle may be rotated relative to its cradle and has an automatic closing means.

It is another object of the present invention to provide a one-hand operated safety pin having means thereon to disengage and pivot the socket of the pin from the sharp pin portion and means to automatically return said socket to enclose said sharp pin portion.

It is also another object of the present invention to provide a safety pin with a plunger connected to its socket member and said plunger having means to move said socket member away from the pin portion and automatically returning said socket and needle portions to their original closed positions.

It is further another object of the present invention to provide an improved self-closing safety pin having a plunger and a return spring for moving the socket portion of the pin away from the pointed pin portion when it is desired to utilize said pin.

Other objects, features, and advantages of the present invention will become apparent to those skilled in the art after a careful consideration of the following detailed description when taken in conjunction with the drawing wherein like reference numerals refer to like and corresponding parts.

In the drawing:

FIGURE 1 is an elevational view of a safety pin constructed in accordance with the principles of the present invention;

FIGURE 2 is an elevational view of the safety pin in its open position and constructed in accordance with the principles of the present invention;

FIGURE 3 is a partial longitudinal cross-sectional view with parts in elevation of the safety pin of FIGURE 1 and constructed in accordance with the principles of the present invention; and FIGURE 4 is a transverse cross-sectional view of the safety pin constructed in accordance with the principles of the present invention and taken along lines IV—IV of FIGURE 3.

As shown in the drawing:

The safety pin and the like of the present invention comprises a J-shaped pin member having a rearward leg and a forward leg with a pointed end, a U-shaped socket member having a rearward leg and a forward leg with a hollow cylindrical socket formed in the end thereof and adapted to retain and enclose the pin forward leg pointed end, a twisted shank member extending from the end of the socket rearward leg into a cylindrical plunger housing, a plunger member connected to the other end of the shank and slidably received within the plunger housing, said pin rearward leg being fixedly secured to said plunger housing, means to maintain said safety pin in its closed position with its pointed end within and enclosed by said hollow socket, means to axially move said socket member away from said pointed pin end and simultaneously pivot the socket away from said pointed pin end when said plunger is depressed within the plunger housing, and means to automatically close said safety pin.

Referring to FIGURES 1 through 4 there is illustrated a safety pin 11 constructed in accordance with the principles of my present invention. The safety pin 11 may be formed of metal or of the many suitable molding plastics.

The safety pin 11 has a U-shaped rod socket member 12 having a socket forward leg 13 and a rearward leg 17. The forward leg 13 has a cylindrical socket 14 with an open end 16 formed therein and the rearward leg 17 has a flared end 18 facing in the same direction as the socket open end 16.

A rectangular shank 19 extends concentrically from the flared end of the socket member leg 18. The shank 19 extends straight for a predetermined distance from the flared end 18 and is then gradually twisted 90° or any other suitable angle as indicated at 21, in order to first allow the socket 14 to be axially moved away from the pointed pin end 33 and then simultaneously pivotally and axially moved with respect to the pointed pin end 33. The shank may be integral with the leg 18 or may be attached thereto by suitable means such as welding and/or bonding.

The shank is slidably mounted within a tubular plunger housing 23 having an end wall 24 integral therewith or suitably attached thereto. The end wall 24 faces the socket member 12 and has a rectangular aperture 26 formed therein. The dimensions of the rectangular aperture 26 are complementary or slightly greater than the cross-sectional dimensions of the rectangular shank 19 so that the shank 19 may freely pass through the slot 26. The shank 19 normally extends within the plunger housing 23 with the socket member flared end 18 abutting the outer surface of the end wall 24. The socket member flared end 18 has a larger diameter than the width of the slot 26 to prevent the socket member leg 17 from passing through the slot 26.

A cylindrical plunger 27, sized to freely slide within the cylindrical housing 23, has one end suitably attached to the other end 28 of the shank 19. The plunger 27 is sized such that its other end projects outwardly a predetermined distance from the other end 29 of the plunger housing 23.

A compression spring 30 is mounted within the housing 23 between the housing end wall 24 and one end of the plunger 27. The spring 30 urges the plunger away from the end wall 24 and the socket flared end 18 towards the end wall 24.

A J-shaped needle or pin member 31 has a long forward leg 32 with a pointed end 33 and a short rearward leg 34 suitably affixed to or formed integral with the plunger housing 23.

The short needle member leg 34 is attached to the cylindrical housing 23 such that when the safety pin is in its normally closed position, as illustrated by FIGURES 1 and 3, the pointed pin end 33 rests within and is enclosed by the socket 14.

The safety pin compression spring 30 exerts a force on the socket member to maintain the pointed pin end 33 in the socket 14. The pointed pin end is released from the socket only when sufficient force is exerted on the plunger to overcome the closing force of the spring. However, when the plunger is released, the pointed pin end automatically returns to the socket 14. Therefore, when the open safety pin, whether it is the knitting, crocheting, darning, marking, diaper or skirt pinning size, is placed on a table or elsewhere, it is automatically closed so that the dangerous sharp pointed needle or pin end 33 is not exposed but is safely within the socket 14.

Therefore, in operation, the safety pin is held in one hand with the forefinger on the plunger. The plunger 27 moves into the plunger housing when pressure exerted by the forefinger moves the plunger towards the plunger housing end wall 24 and thereby slides the shank 28 outwardly through the slot 26. After the shank moves outwardly through the slot 26 a predetermined distance and the socket 14 is axially moved away from the pointed end 33, the slot engages the shank twist 21 to twist or pivot the socket 14 radially away from the point 33. When the safety pin is in its open position, as is illustrated in FIGURE 2, the socket leg 13 extends parallel to the needle leg 32 but does not extend axially concentrically therewith as it does when the safety pin is in its closed position, as illustrated by FIGURE 1. When the operator releases his forefinger from the plunger 27, the compression spring 30 urges the socket flared end 18 towards the socket housing end 24 and returns the socket 14 to the position illustrated by FIGURES 1 and 3 wherein it cradles or encloses the pointed pin end 33.

Therefore, it is seen where I have provided an improved safety pin which may be operated with one hand and is self-closing.

It is of course understood that the above embodiment is only for exemplary purposes and that a great number of other modifications and embodiments will be readily apparent to those skilled in the art. Therefore, my invention is not to be limited to the particular arrangement shown and described but should encompass all modifications within the spirit and scope of the hereunto appended claims.

I claim as my invention:

1. A self-closing safety pin comprising:
   a socket member having a socket formed in one end thereof,
   a shank member connected to the other end of said socket member,
   a housing,
   said shank slidably passing through said housing,
   a manual plunger attached to the end of said shank,
   said plunger being slidably mounted in said housing and having one end projecting outwardly a predetermined distance from the housing,
   a pin member having one end thereof forming a pointed end and having its other end connected to said housing such that when the safety pin is in its closed position, the pointed end is within the socket,
   said plunger being adapted to manually open said safety pin with said pointed end being spaced from said socket,
   means to turn said shank and pivot said socket relative to said pin pointed end,
   self-closing spring means in said housing to normally maintain said safety pin in its closed position and return the pointed pin end to the socket when said plunger is released.

2. A self-closing safety pin comprising:
   a socket member having a socket formed in one end thereof,
   a shank member connected to the other end of said socket member,
   a housing having an end wall with a slot formed therein and facing said socket other end,
   said shank slidably passing through the slot into said housing,
   a plunger attached to the end of said shank,
   said plunger being slidable in said housing,
   means to gradually turn said shank when it is axially moved from its normal position,
   a pin member having one end being pointed and having the other end attached to said housing such that when the safety pin is in its closed position, the pointed end is within the socket,
   said plunger being adapted to manually open said safety pin with said pointed end being spaced from said socket,
   spring means mounted in said housing to urge said plunger away from said end wall and place said safety pin in closed position with the shank in its normal position,
   said spring maintaining said safety pin closed except when its spring force is overcome by a force exerted on said plunger to axially and pivotally move said socket away from said pin pointed end.

3. A self-closing safety pin having a pointed end and comprising:
   a socket member having a socket formed in one end thereof,
   a shank member attached to the other end of the socket member,
   said shank being gradually twisted a predetermined amount,
   a tubular housing having an end wall with a slot formed therein,
   said shank slidably passing through the slot into said housing,
   said slot being sized complementary with the cross-sectional dimensions of the shank to turn said shank as the shank twisted portion passes therethrough,
   a plunger attached to said shank,
   said plunger being slidably mounted in said tubular housing,
   said plunger being adapted to manually open said safety pin with said pointed end being spaced from said socket,
   a pin member having one end provided with said pointed end and having the other end attached to said housing such that when the safety pin is in its closed position, the pointed end is within the socket,
   a self-closing spring means encircling said shank and being mounted in said housing between said plunger and said housing end wall to urge said plunger away from said end wall, and
   said spring maintaining said safety pin closed except when its spring force is overcome by a force exerted on said plunger to axially and pivotally move said socket away from said pointed end.

4. A self-closing safety pin having a pointed end and comprising:
   a socket member having a cylindrical socket formed in one end thereof,
   a rectangular shank member axially projecting for a predetermined distance from the other end of the socket,
   said shank being gradually twisted a predetermined amount,
   a tubular housing having a wall with a rectangular slot formed therein,
   said shank slidably passing through the rectangular slot, said rectangular slot being sized complementary with the cross-sectional dimensions of the rectangular shank to turn said shank as the shank twisted portion passes therethrough,
a plunger attached to the shank,
said plunger being slidable in said tubular housing,
said plunger being adapted to manually open said safety pin with said pointed end being spaced from said socket,
a pin member having one end provided with said pointed end and having the other end attached to said housing such that when the safety pin is in its closed position, the pointed end is within the cylindrical socket,
a self-closing spring encircling said shank and being mounted in said housing to urge said plunger and safety pin into a normal closed position, and
said spring maintaining said safety pin closed except when its spring force is overcome by a force exerted on said plunger to axially and pivotally move said socket away from said pointed end.

5. A self-closing safety pin comprising:
a U-shaped socket member having a cylindrical socket formed in the end of one leg and having a flared end on the other leg,
a rectangular shank member projecting from said flared end,
said shank being gradually twisted a predetermined distance from said flared end,
a tubular housing having a wall with a rectangular slot formed therein and facing said flared end,
said shank slidably passing through the rectangular slot into said housing,
said rectangular slot being sized complementary with the cross-sectional dimensions of the rectangular shank to turn said shank as the shank twisted portion passes therethrough,
said flared end having a diameter larger than the width of said rectangular slot,
a plunger attached to the shank,
said plunger being slidable in said tubular housing,
a J-shaped pin member having the end of its long leg being pointed and having its short leg connected to said housing such that when the safety pin is in its closed position, the pointed end is within the cylindrical socket,
self-closing means connected to said housing to normally urge said plunger and safety pin into a closing position, and
said spring maintaining said safety pin closed except when its spring force is overcome by a force exerted on said plunger to axially and pivotally move said socket away from said pointed end.

6. A self-closing safety pin having a pointed end and comprising:
a U-shaped socket member having a cylindrical socket formed in the end of one leg and having a flared end on the other leg,
a rectangular shank member axially projecting for a predetermined distance from said flared end,
said shank being gradually twisted 90° a predetermined distance from said flared end,
a tubular housing having an end wall with a rectangular slot formed therein and facing said flared end,
said shank slidably passing through the rectangular slot into said housing,
said rectangular slot being sized complementary with the cross-sectional dimensions of the rectangular shank to turn said shank as the shank twisted portion passes therethrough,
said flared end having a diameter larger than the width of said rectangular slot,
a plunger attached to the end of said shank,
said plunger being slidable in said tubular housing and having one end projecting outwardly a predetermined distance from the end of the housing opposite the end wall,
said plunger being adapted to manually open said safety pin with said pointed end being spaced from said socket,
a J-shaped pin member having the end of its long leg provided with said pointed end and having its short leg connected to said housing such that when the safety pin is in its closed position, the pointed end is within the cylindrical socket,
a self-closing compression spring encircling said shank and being mounted in said housing between said plunger and said housing end wall to normally urge said plunger away from said end wall and the safety pin into closed position, and
said spring maintaining said safety pin closed except when its spring force is overcome by a force exerted on said plunger to axially and pivotally move said socket away from said pointed end.

7. A self-closing safety pin comprising:
a pin member having a point at one end thereof,
a socket member having a hollow socket formed thereon for receiving said point,
an elongated plunger formed on one of said members,
an elongated housing formed on the other of said members and having means forming an axially extending guide thereon shaped complementarily to said plunger for carrying said plunger in reciprocal axial movement on said housing,
means normally biasing said plunger in one direction away from said housing,
stop means limiting movement of said plunger in said one direction to a first position thereof whereat one end of the plunger protrudes beyond said housing and whereat said socket is in axial alignment and receiving relation with said point,
said plunger being movable in an opposite direction toward said housing into a second position thereof whereat said socket is out of receiving relation with said point, and
cooperable means formed on said housing and on said socket member for moving said socket out of axial alignment wtih said point when said plunger is moved to said second position thereof.

References Cited by the Examiner

UNITED STATES PATENTS

| | | | |
|---|---|---|---|
| 703,715 | 7/1902 | Wentzel | 24—155 |
| 2,246,495 | 6/1941 | Alessi et al. | 24—158 |
| 2,553,782 | 5/1951 | Orchard et al. | 24—162 |
| 2,692,415 | 10/1954 | Forde | 24—156 |

FOREIGN PATENTS

| | | |
|---|---|---|
| 2,120 | 9/1856 | Great Britain. |
| 3,073 | 11/1890 | Great Britain. |

WILLIAM FELDMAN, *Primary Examiner.*
DONALD A. GRIFFIN, *Examiner.*